May 19, 1936.  G. W. WALTON  2,041,036
FREQUENCY RANGE CONVERTER
Filed Aug. 8, 1932   3 Sheets-Sheet 1

Inventor,
George W. Walton,
Attorneys

May 19, 1936.                G. W. WALTON                2,041,036
                        FREQUENCY RANGE CONVERTER
                          Filed Aug. 8, 1932            3 Sheets-Sheet 2

Inventor
George W. Walton
Cushman, Bryant, Darby, Cushman
Attorneys

May 19, 1936.  G. W. WALTON  2,041,036
FREQUENCY RANGE CONVERTER
Filed Aug. 8, 1932  3 Sheets-Sheet 3

Inventor
George W. Walton
Cushman Bryant Darby & Cushman
Attorneys

Patented May 19, 1936

2,041,036

UNITED STATES PATENT OFFICE 2,041,036

FREQUENCY RANGE CONVERTER

George William Walton, London, England

Application August 8, 1932, Serial No. 627,963
In Great Britain December 1, 1931

8 Claims. (Cl. 178—44)

This invention relates to methods of and means for converting electrical oscillations of one range of frequencies into electrical oscillations of a second range of frequencies, the second range being representative of the first range and being capable of substitution for that first range in any process of electrical practice. The invention is particularly but not exclusively concerned with electrical oscillations representing sound. The invention also provides means for the reconversion of the second range of frequencies into the original or into any other expanded range of frequencies.

Hitherto all known methods of transmitting sound by electrical means have used a range of electrical frequencies each of which corresponds exactly to a sound frequency, that is to say, if a sound is composed of four different frequencies, it has been represented by four electrical frequencies, each of which has the same frequency as the original sound. In such spheres as electrical transmission of sound, electrical recording and reproduction of sound and the like, very great difficulties have been experienced due to the fact that the range of sound frequencies which are audible to the human ear is very wide, ranging between twenty per second to twenty thousand per second approximately ten octaves. As a result of this, great difficulties are experienced in telephones, wireless telephony, gramophones and the like. For instance in telephone lines of great length the cut off frequency is often not greater than between 2000 and 3000 cycles per second, so that a large portion of the sound frequency range is completely eliminated in transmission. This is a very serious difficulty and hitherto has been wholly insuperable. Again in wireless telephony, methods hitherto used have consisted of modulating a high frequency oscillation with sound frequencies, thereby producing side bands of the carrier oscillation, each of which side bands has a range of frequencies equal in width or frequency separation to that of the original band. The whole range of wireless frequencies necessary to transmit telephony has been about twenty kilocycles wide, with the result that only a very limited number of wireless stations may transmit simultaneously, because each station requires a separate band of frequencies, and the transmission bands of no two stations must be allowed to overlap, as otherwise serious interference with each other would result. In sound recording and reproducing great difficulties have hitherto been experienced due to the inability of the recording apparatus to impress the highest frequencies on the record. For instance, in the gramophone plate record all frequencies above 6000 cycles per second are eliminated, i. e. a very large portion of the sound frequency range is removed. Further the material of the gramophone plate has usually a texture which makes it impossible to record the higher frequencies. In talking film sound records, difficulty is experienced in recording the higher frequencies due to the size of the photographic grain, the length of film available for the record, the speed at which it must be run, and the speed of response of the photographic emulsion to light.

The object of the present invention is to remove these difficulties in the spheres mentioned, and for this purpose entirely new methods and devices are provided.

The human ear has a certain resolving power, that is to say, two adjacent sound frequencies must differ from each other by a certain percentage in wave length. In arriving at what this percentage is, account must be taken of present day music. In the western civilizations musical notes generally vary by half a tone, that is to say, there are not more than sixteen sound frequencies distinguishable in one octave. Oriental music on the other hand goes somewhat further than this, and quarter tones are made use of, so that there are not more than 32 sound frequencies in every octave. In general it is extremely difficult for the average human ear to distinguish more than 64 distinct sound frequencies in every octave. From this it will be appreciated that the resolving powers of the human ear are extremely limited.

In electrical apparatus means are known whereby frequencies much closer together can be distinguished and a resolution of about .5% between two frequencies can be readily obtained, particularly when it is not required that those frequencies should actuate instruments, or be isolated from each other.

It is well known to convert one range of frequencies into a different range of frequencies. For example in wireless telephony where a carrier of say a millon cycles per second is modulated by a band of sound frequencies extending from 30 to 10,000 cycles per second, one side band contains a band of frequencies extending from 1,000,030 to 1,010,000 cycles per second. But it will be noted that the band width or the separation between extreme frequencies in the band has remained unaltered; namely 99,970. Similarly in heterodyning the band width remains unaffected.

The present invention provides means whereby one frequency of a range of primary frequencies may initiate or in effect be converted into, another frequency of a secondary range, and wherein the band width of the secondary range is different from that of the primary range.

A range of sound frequencies strictly speaking consists of a continuous range of frequencies, that is to say an infinite number of different frequencies, but due to the poor resolution of the human ear, a discontinuous range of frequencies may be used, that is, a limited number of frequencies will be capable of representing sound for all practical purposes.

In this invention both methods may be used, that is to say, the secondary, representative range of frequencies produced from a continuous range of primary frequencies may also be continuous and have an infinite number of frequencies. Alternatively the second representative range may consist of only a limited number of frequencies, each primary frequency being converted into the secondary frequency nearest to that which strictly corresponds to the primary frequency. Thus each secondary frequency is representative of a narrow band of primary frequencies. When such a secondary frequency range is reconverted into a normal sound frequency range, only an equal limited number of frequencies is present. In this second method strictly speaking, there will be some changes of frequencies, but each frequency of the original sound will be reproduced as a frequency very close to the original sound frequency, so close indeed that the human ear will be incapable of distinguishing any difference.

The invention will be described with reference to the accompanying drawings, it being of course understood that these drawings are purely illustrative and that the invention is by no means limited to the particular forms shown, but includes all arrangements within the scope of the appended claims.

Figures 1A, 1B, 2, 3:
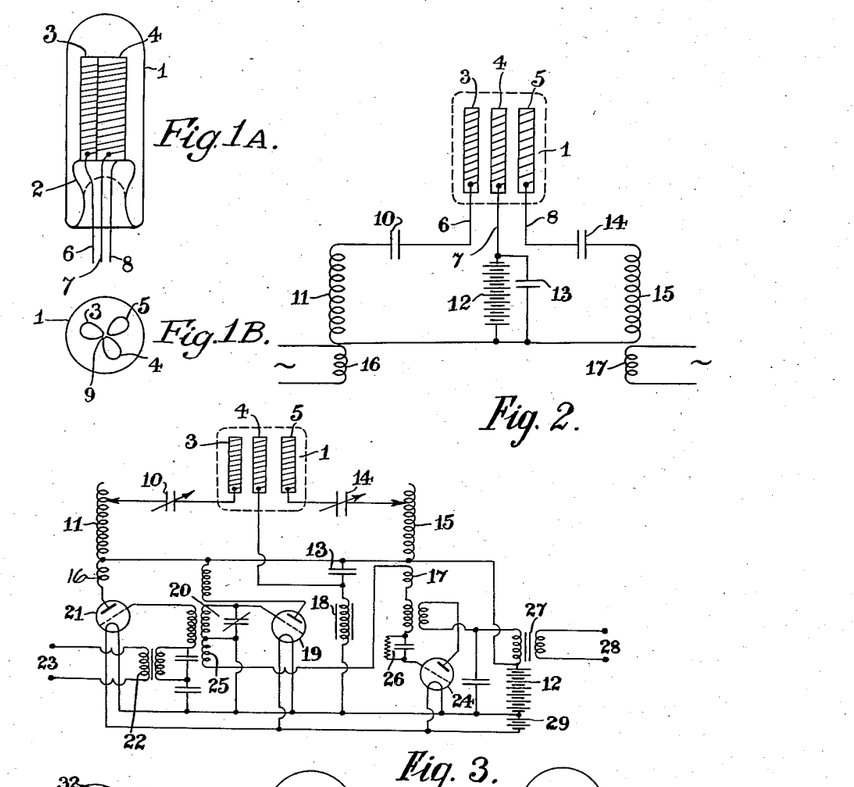
Figs. 1A and 1B show diagrammatically, in elevation and plan respectively, one form of frequency range converter using three coils.
Fig. 2 shows a diagram of the circuits, connections and auxiliary device by means of which device one is able to convert frequency ranges.
Fig. 3 shows more fully the connections and arrangement necessary for frequency range conversion.

In Fig. 1 an evacuated vessel 1 contains three coils 3, 4 and 5 supported by a pinch 2. One end of each of the coils 3, 4 and 5 is connected to external circuits by means of the leads 6, 7 and 8 respectively, which pass through and are sealed into the pinch 2. The vessel 1 contains a gas such as neon, argon and the like at a suitable pressure, so that under an applied electrical potential of suitable value a glow discharge takes place between the coils within the vessel 1. All of the coils 3, 4 and 5 have the same number of turns, and preferably also the same inductance, that is to say the cross sectional area of each coil is preferably the same. The former on which each coil is wound may be of any suitable material for instance, glass tubing or the like, and the wire of the coils should preferably be bare, at least at the points where the three coils are close together, namely at 9 in the cross sectional view B. The coils 3, 4 and 5 should be wound in the same direction, i. e. all clockwise or all anti-clockwise. It is desirable that the pressure and type of gas used in the device of Fig. 1 should be such that there is some lag in the action of the device, that is to say that a glow discharge once established between the coils should not be immediately extinguished when the potential producing it is removed, but the lag should in no case be longer than the time interval required by the human ear to detect a change in sound which is believed to be between one-sixteenth and one thirty-second of a second.

The device of Fig. 1 can be used to produce a discontinuous range of frequencies for example as shown in Fig. 2. 1 is a diagrammatic representation of the device of Fig. 1 with its three coils 3, 4 and 5 and leads 6, 7 and 8. The lead 6 is connected through a condenser 10 and an inductance 11 to the positive pole of the battery 12 across which is shunted a by-pass condenser 13. The negative pole of the battery 12 is connected by means of the lead 7 to the coil 4. The coil 5 is connected to the positive pole of the battery 12 through lead 8, condenser 14 and coil 15. There are, therefore, two oscillatory circuits, the first containing coil 3, condenser 10, coil 11 and coil 4, and the second containing coil 5, condenser 14, coil 15 and coil 4. The battery 12 applies to the device such a potential that an electric discharge just cannot take place from coils 3 and 5 to coil 4. When a discharge takes place at any point between coils 3 and 4, a connection is made between the coils at this point and the first circuit will be tuned to a definite frequency which is the natural frequency of the circuit comprising the inductance 11, condenser 10 and the parts of coils 3 and 4 between the discharge point and the leads 6 and 7. Should the point of discharge move along the coil, so will the tuning of the circuit change accordingly. As the coils 3, 4 and 5 have an equal number of turns, say 1000 each, then there will be in the first circuit 1000 tuning points, and similarly there will be 1000 tuning points in the second circuit. If the coil 16, which is coupled to coil 11, is energized by a band of frequencies, the first circuit will be energized at those frequencies. Suppose that the range of applied frequencies is such that the first circuit resonates at the highest frequency of the range when a connection between coils 3 and 4 is made at a point where the whole of both coils are excluded from the tuned circuit, and that the circuit resonates at the lowest frequency of the band when connection is made between coils 3 and 4 at a point which includes the whole of those coils within the tuned circuit, then that circuit will be capable of responding to the whole range of frequencies, but the tuning of the circuit will only take place at 1000 points between coils 3 and 4.

For any one frequency in the applied range, there will be some point of discharge along coil 3 to an opposite point on the coil 4 which offers the least impedance to the oscillation in the tuned circuit, and consequently discharge will take place at that point. Similarly every other frequency in the applied range of frequencies will cause a discharge at some corresponding point between coils 3 and 4, and more than one frequency may be present simultaneously, each producing its own discharge between coils 3 and 4.

When a discharge takes place between coils 3 and 4, there will be a cathode glow on coil 4 and as can be seen from the arrangement in Fig. 1B, this will reduce the resistance to discharge between coils 5 and 4, thereby initiating a discharge between coils 5 and 4 at a point exactly opposite the discharge between coils 3 and 4, for the potential between coils 5 and 4 is such as to be just below striking voltage and therefore when the resistance to discharge between those coils is reduced, a discharge immediately takes place. It will, therefore, be appreciated that every discharge between coils 3 and 4 will produce a discharge between coils 4 and 5, and as the circuit containing coils 4 and 5 is also a tuned circuit, each discharge will set up in the second tuned circuit an oscillation of a frequency determined by the natural frequency of the circuit comprising the condenser 14, inductance 15 and those parts of the coils 4 and 5 between the discharge point and the leads 7 and 8. The range of frequencies applied through coil 16 will therefore produce in the second tuned circuit a corresponding range of frequencies which may be withdrawn through coil 17.

If condensers 10 and 14 are equal, and coils 11 and 15 are equal, then the range of frequencies in coil 17 will be the same as the range of frequencies in coil 16, with the difference that there will be only 1000 distinct frequencies in coil 17. If coil 11 has a different inductance from coil 15, then the range of frequencies in coil 17 will be entirely different from the range of frequencies in coil 16. The former range will still be representative of the range in coil 16, but the representation will be only by 1000 separate frequencies, each corresponding to a small range of frequencies within the range in coil 16, and the amplitude of each frequency in coil 17 will correspond to the amplitude of the frequency it represents in coil 16, because an increase of amplitude of one frequency in coil 16 will produce a more intense discharge between coils 3 and 4 thereby producing a lower resistance to discharge between coils 4 and 5. For example, suppose the range of frequencies in coil 16 is one side band of a sound modulated oscillation, say 1,000,032 to 1,016,384 cycles per second, and suppose that the circuit containing coils 3 and 4 has such constants that the frequency 1,016,384 produces a discharge between coils 3 and 4 at a point which cuts out the whole of coils 3 and 4 from the tuned circuit and that the frequency 1,000,032 produces a discharge between coils 3 and 4 at a point which cuts in the whole of coils 3 and 4. If the coil 15 and the condenser 14 are of such values that a discharge between coils 4 and 5 which cuts out the whole of coils 4 and 5 from the tuned circuit produces a frequency of 1,000,032 cycles per second and a discharge between coils 4 and 5 which cuts in the whole of coils 4 and 5 produces a frequency of 1,000,128, then in the circuit containing coil 11 we have a frequency range from 32 to 16,385 plus $10^6$ cycles per second, and in the circuit containing coil 15 there is a frequency range from 32 to 128 plus $10^6$ cycles per second. Thus the second range corresponds exactly to the first range of frequencies but is considerably narrower. By heterodyning the oscillations in coil 17 with a carrier oscillation of one million per second and rectifying, a range of low frequencies from 32 to 128 cycles per second will be obtained, and this range will represent the range of sound frequencies from 32 to 16,384 cycles per second which were used to produce the frequencies in coil 16 by modulating an oscillation of one million per second, i. e. a sound range of nine octaves is represented by two octaves, resulting in a compression to about one-fifth of the range. If necessary, increased lag of the device of Fig. 1 can be obtained by connecting an inductance in series with the battery 12 in Fig. 2, so that the by-pass condenser 13 is shunted across both the battery and the inductance.

The advantages obtained from this compression of frequency band in ordinary line telephony are firstly that it is possible to transmit perfect telephony over the longest lines and even submarine cable without any essential frequency being eliminated or reduced, secondly extreme care in the arrangement of the constants of the transmission lines becomes unnecessary, that is, loading coils and the like are unnecessary, thirdly over one telephone line several telephonic communications may take place simultaneously without any one being seriously disturbed by any other or by the constants of the circuit. In wireless telephony advantages will be readily apparent for the whole transmission band will be only 256 cycles wide, thereby enabling increased selectivity in receivers, improved efficiency of transmitters and receivers, and an increase of the number of stations which may transmit simultaneously without interference. In sound recording and reproduction, equal advantages are obtained. A gramophone record will be able to accommodate a much longer record, and at the same time perfect sound will be recorded up to the highest audible frequencies and in talking films similar advantages may be obtained.

Many other arrangements may be used to obtain similar effects. For instance in the circuit including coil 3 in Fig. 2, both the side bands and the carrier of a modulated oscillation may be applied, so that for every frequency in the band there is a corresponding discharge point along coil 3 and the circuit containing coil 5 may have such constants that an entirely different band of frequencies is produced in the circuit by discharges from coil 3 to coil 4. This derived band of frequencies may have an entirely different carrier frequency, but nevertheless there will be an effective narrowing of the modulating frequency band if suitable values of coils and condensers are chosen.

The second representative range of frequencies as above described, i. e. 32 to 128 cycles per second, may be used for all purposes connected with transmission, reception, recording and reproduction of oscillations in just the same way as the original sound frequency range of 32 to 16,384, but with all the advantages previously described. It is only necessary that after these various processes have been accomplished, the two octave range shall be re-converted into a nine octave range by the arrangement of Fig. 2 or one similar to it. Obviously, the re-conversion involves exactly the same process as that previously described, except that it is arranged to produce an expanded range instead of a contracted range of frequencies.

Fig. 3 shows a circuit arrangement which may be used to obtain a frequency range conversion. The device of Fig. 1 is used as in Fig. 2, and an inductance 18 is arranged in series with the battery 12 as previously described. An oscillating triode 19 has its tuned circuit 20 coupled to the grid circuit of the triode 21 and a transformer 22 is also included in the grid circuit and is fed through terminals 23 with any range of frequencies. In coil 16 there appears a modulated oscillation which energizes the tuned circuit of coil 3 as before, thereby producing in the circuit of coil 5 a second range of frequencies which are applied to the rectifying triode 24 through the coil 17 in its grid circuit. A coil 25 coupled to the tuned circuit 20 also supplies to the triode 24 the carrier oscillation which is rectified together with the range of frequencies from the circuit of coil 5 by means of the leaky grid condenser 26 and the triode 24 whilst the anode circuit of the triode 24 may be coupled to the grid circuit thereof as shown to increase the output. The low frequency oscillations produced by rectification in the triode 24 are passed by transformer 27 to the secondary output terminals 28. One anode battery 12 supplies potentials to all the triodes as well as to the device 1 and one filament heating battery 29 supplies current to all the filaments of the triodes. The arrangement of Fig. 3 may be used for a contraction of a frequency range as well as for an expansion thereof, i. e. reconversion. Many suitable circuit arrangements may be used other than that of Fig. 3 and are all within the scope of the invention, the essential device of any such arrangement being that of Fig. 1 or any equivalents thereof such for example as are herein described.

Figure 4:
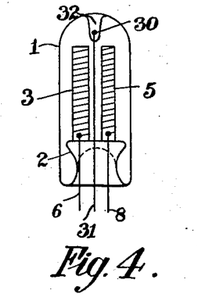
Fig. 4 shows an alternative form of frequency range converter using two coils and one conductor.

In the device of Fig. 1 the coil 4 may be replaced by a plain conductor as shown for example in Fig. 4, where 30 is a straight conductor such as a metallic wire, supported between the pinch 2 and an insulating support 32. Connected to the conductor 30 is a lead 31 which passes through and is sealed in the pinch 2. The device of Fig. 4 operates in exactly the same way as the device of Fig. 1 and is connected to circuits in exactly the same way, the lead 31 of Fig. 4 being connected in the same way as lead 7 of Fig. 1.

Figure 5:
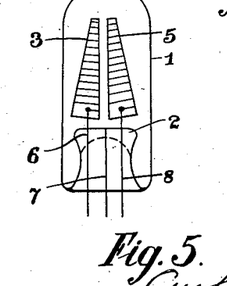
Figs. 5 to 7 show alternative forms of frequency range converter.
Figure 6:
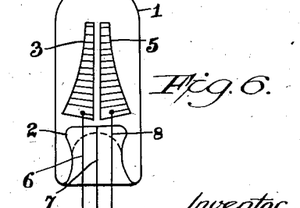

In some cases it is necessary that the limited number of frequencies to which the device of Figs. 1 and 4 can respond should follow some more complex law, for instance the output frequencies may be arranged as a harmonic scale or there may be a constant difference of frequency or any other suitable variation as desired. For this purpose the coils 3 and 5, and in some cases the coil 4 also, of Fig. 1 may be so constructed that the inductance of successive turns of the coils changes along the length of the coil. This may readily be accomplished by arranging that the former on which the coil is wound varies in cross-sectional area along its length as required. For instance the coil former 10 may be a truncated cone as shown in Fig. 5, or it may have a curvilinear variation of cross-section of any type such as that shown in Fig. 6. It should be noted that whatever the shape of the coils may be, in that region where discharge takes place between the coils they should preferably be parallel, so that the resistance of the discharge path is constant throughout the length of the coil as otherwise the amplitudes of the frequencies of the second range will not be proportional to those of the actuating frequencies. This point is not essential, for in some cases it may be desirable that the amplitude of some frequencies shall be reduced relative to others, for instance, low frequencies may have correspondingly lower amplitudes than the higher frequencies, and vice versa in order to compensate for the characteristics of some of the devices handling these frequencies. The devices of Figs. 5 and 6 may also be of the type shown in Fig. 4, that is to say two coils co-operating with a simple conductor.

It will be noted that the devices of Figs. 1, 4, 5 and 6 act not only to cut out or cut in inductance but also to vary the capacity between the turns of adjacent coils and in the use of these devices for any particular purpose this inter-coil capacity must be taken into account as it obviously plays some part in the tuning of the circuits.

Figure 7:
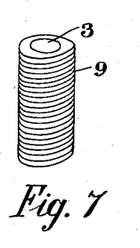

In the designing of the devices of Figs. 1, 4, 5 and 6, it is preferable that the points of discharge from a coil should be along a defined line and to obtain this the former on which the coil is wound may have a sharp ridge forming something like a knife edge over which the turns of the coil are wound as shown at 9 in Fig. 7 and at 9 in Fig. 1B. The ridges of the coils are arranged so as to constitute the boundaries of the shortest path of discharge between any two coils as shown at 9 in Fig. 1B, where the ridges of the three coils are disposed at the corners of a triangle, which is preferably equilateral. In the case of the device of Fig. 4, the ridges of the two coils may be at two corners of a triangle and the conductor 30 at the third corner of the triangle. By arranging the device in this way, the glow discharge on the cathode, i. e. coil 4 in Fig. 1 and conductor 30 in Fig. 4 will be such as to cause a definite reduction of the resistance of the discharge path between the cathode and the two anodes.

The second range of frequencies in Fig. 2 may be used directly for wireless transmission and will be in the form of one side band without carrier. In receiving this band, it may be applied to a circuit arrangement such as shown in Fig. 2, and the carrier frequency added on the output side, in order to obtain the original modulation by rectification as in normal wireless practice. This method is not very desirable in wireless transmission as the single side band without carrier wave is difficult to receive. This is because the local carrier oscillation at the receiver is likely to be very unstable, and to be continually changing its phase. The carrier oscillation in coil 16 of Fig. 2 may however be transmitted with the range of frequencies from coil 17 in Fig. 2, but even this is not as stable as is desirable and one side band only of the carrier does not allow the use of extremely selective circuits at the receiver. It is therefore desirable that the transmission should be in the form of a carrier oscillation with two side bands. Oscillations of this character can be obtained, as already described, by applying a carrier oscillation with both side bands to the coil 16 in Fig. 2. This method is however not entirely satisfactory because the lowest frequency of the contracted transmission band appearing in coil 17 would be less than 16 per second and as this is greater than the smallest time interval in which the human ear can detect a change of sound, difficulties may be experienced.

Figure 8:
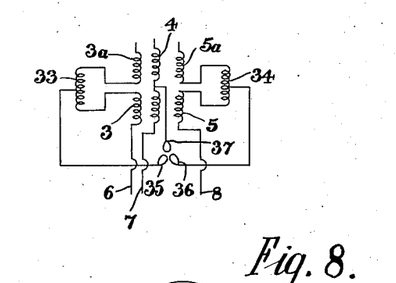
Fig. 8 shows diagrammatically the connections of a frequency range converter for converting one modulated oscillation into a second modulated oscillation.

A better method is shown in Fig. 8, where instead of the device of Fig. 1 a special type of device is used, in which the coils are each in two sections, 3 and 3a, 5 and 5a, and in which an inductance 33 connects the two halves 3 and 3a together whilst an inductance 34 connects the two halves 5 and 5a together. The value of the inductance 33 is made such that the higher of the two sides frequencies corresponding to the lowest modulation frequency will cause a discharge from the upper end of coil 3 and the lower of the two side frequencies corresponding to this same modulation frequency will cause a discharge from the lower end of coil 3a. In general the lowest modulation frequency will be higher than 20 per second. Similarly the value of the inductance 34 is arranged so that the lowest modulation frequency appearing in the contracted range of frequencies is also greater than 20 per second. This is done by arranging that the difference between the resonant frequency when only the coil 5 is in circuit with the half of coil 4 and the resonant frequency when both coil 5 and coil 34 are in circuit therewith is greater than 40 cycles.

Thus it will be seen that frequencies below the lowest which it is desired to convert require a tapping to be made somewhere in coil 33 to produce resonance and these frequencies therefore cause a discharge to pass across the gap between discharge points 35 and 37. This discharge reduces the resistance between points 36 and 37 and initiates in the second circuit an oscillation having a resonant frequency equal to that of the second circuit with the whole of coil 5 and one half of coil 34 in circuit with the half of coil 4. The range of frequencies in the circuit of coil 5 may be used for transmission or reception purposes in the same way as in normal wireless communication and extreme selectivity will be obtainable. At the receiver, conversion may be obtained by using the arrangement of Fig. 8.

Another method of wireless transmission and reception using the invention, which is comparatively simple, consists in converting the sound frequency range into a second range of half the width, that is to say, each primary frequency appears at half the frequency in the secondary range. The secondary range is thus used to modulate the carrier oscillation and before transmission the constant carrier oscillation is eliminated by any of the known methods, so that only the side bands are transmitted. At the receiver the side bands alone are received, and a local oscillation equal in frequency to the original carrier oscillation is not used. Consequently reception is obtained by the heterodyning of pairs of side frequencies. Each pair of side frequencies gives rise on heterodyning and detection to a frequency double that of the modulation frequency with which they were produced and consequently the original sound frequency is reproduced. The advantages of this method are that normal wireless receivers may be used and the frequency range converter need only be used at the transmitter. Moreover the actual transmission band is only one half the width of that which is produced by using the original sound frequencies for modulating purposes.

Figures 9, 10, 11, 12, 13, 14:
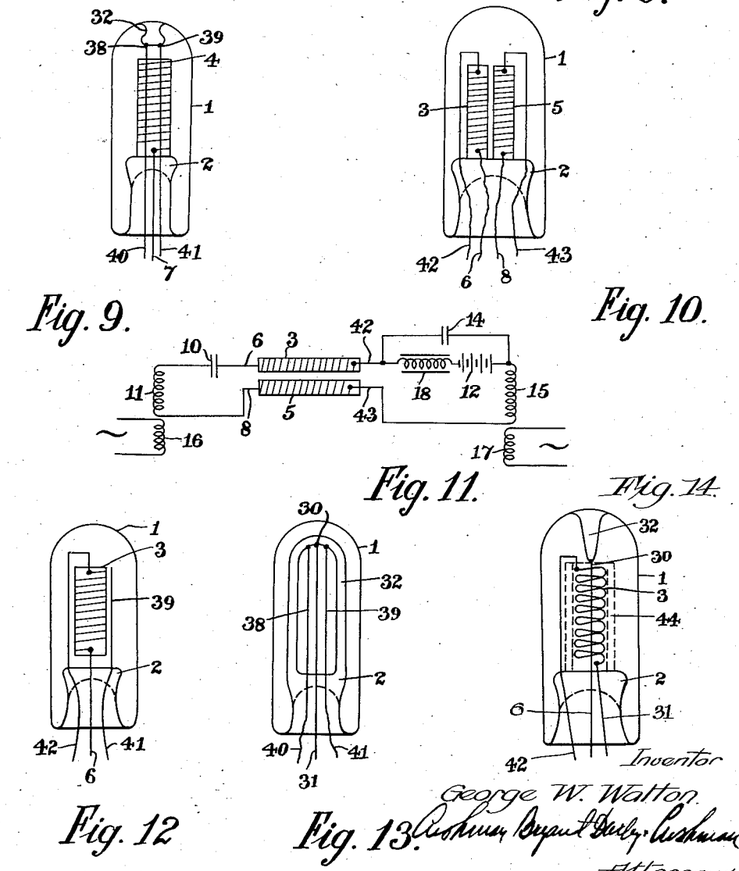
Fig. 9 shows a form of frequency range converter using one coil and two conductors.
Fig. 10 shows a form of frequency range converter using two coils.
Fig. 11 shows a diagram of connections of the device of Fig. 10.
Fig. 12 shows a further form of frequency range converter using one coil and one conductor.
Fig. 13 shows a form of frequency range converter for very high frequencies using three conductors.
Fig. 14 shows a form of frequency range converter using one coil and one conductor.

Fig. 9 shows a type of device using only one coil and two conductors and it may be regarded as the converse of Fig. 4. The conductor 38 takes the place of the coil 3 of Fig. 1 and the conductor 39 the place of coil 5 in Fig. 1 and conductors 38 and 39 are supported between members 2 and 32. The connections of the device in use are exactly the same as those shown in Fig. 2. The coil 4 when connected in the circuit is obviously common to both primary and secondary tuned circuits, just as coil 4 of the device of Fig. 1 is common to both tuned circuits, for the action of the device is practically the same.

It is possible to use a device having only two coils 3 and 5 as shown in Fig. 10, connections being made to both ends of each coil, leads 42 and 43 connecting with the upper ends of coils 3 and 5 and leads 6 and 8 connecting with the lower ends thereof respectively. The connections of the device when in circuit are shown in Fig. 11 from which it will be seen that a portion of each of the coils 3 and 5 is included both in the primary and in the secondary tuned circuits. There is a slight difference in the secondary range of frequencies, in that the highest frequency of the primary range of frequencies will produce the lowest frequency in the secondary range of frequencies, and vice versa, but in practice this is usually of no importance for the secondary range is completely representative of the primary range.

An alternative form of device to that shown in Fig. 10 is shown in Fig. 12 where only one coil 3 is used, having connections to both ends, together with a conductor 39. The device of Fig. 12 is connected into the circuit as shown in Fig. 11, the conductor 39 taking the place of coil 5 in that figure. This device has the same characteristics as the device of Fig. 10.

The frequency range converting devices previously described have all been of the type which produces a discontinuous range of frequencies, but it is possible to obtain a continuous range of frequencies by using the device shown in Fig. 13. In this case the conductor 38 corresponds to coil 3 in the device of Fig. 1, the conductor 30 to coil 4, and the conductor 39 to coil 5. The conductors 38, 30 and 39 are supported between the pinch 2 and an insulating support 32 and are enclosed in an evacuated vessel in which there is a gas at suitable pressure, so that an electric discharge can take place between the conductors. The leads 40, 31 and 41 are connected to one end of the conductors 38, 30 and 39 respectively, and external circuits similar to those shown in Fig. 2 may be used. The frequencies of the applied oscillations must in this case be very high, in order that conductors 38, 30 and 39 shall not be too long. As described in connection with Fig. 2, for each of the applied frequencies there will be a point along the conductor 38 at which one frequency will discharge to an opposite point of the conductor 39, thereby establishing a discharge between conductors 30 and 39 at the same point to produce another frequency in the secondary circuit. In this case portions of the conductors 38 and 30 will be brought into circuit by the discharge, and these portions have electrical constants of such a value that the primary circuit is tuned to the actuating frequency and similarly portions of the conductors 30 and 39 are brought into the secondary circuit to tune that circuit to some corresponding frequency. A portion of the capacity between the conductors 30 and 39 is brought into circuit as well as the inductance thereof and this also affects the tuning of the primary circuit. Similarly a portion of the capacity between the conductors 30 and 39 is brought into the secondary circuit as well as a portion of their inductance. Practically the length of the conductors 38, 30 and 39 is limited, and therefore a practical form of the device of Fig. 9 can only be used with the very highest frequencies.

The limitations of the device of Fig. 13 can be overcome by using the device of Fig. 14.

In Fig. 14 the coil 3 is wound on the inside of an insulating former 44 and conductor 30 passes through the centre of the coil coincident with the axis. Connections of the device in use are similar to those of Fig. 12, and its action is that a discharge can take place from any point of the coil 3 to the conductor 30, and therefore an unlimited number of frequencies may be handled by this device within the range of frequencies to which it will respond. It is preferable that the conductor 30 should be of small diameter in order to prevent losses, and it may be constructed of magnetic material for the purpose of reducing eddy current losses within its mass, although generally these would be so small as to be negligible.

Figure 15:
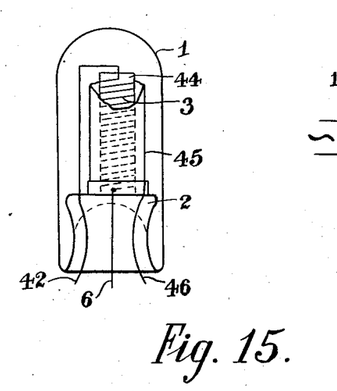
Fig. 15 shows an alternative form of Fig. 14.

Fig. 15 shows an alternative form operating in the same way as the device shown in Fig. 14, except that in this case coil 3 is wound on the outside of the former 44 and surrounding it and concentric with 3 but not making contact therewith 45 is an open-ended cylinder 45 (shown cut away in Fig. 15 to expose coil 3 and former 44) which acts as a conductor to which the coil 3 can discharge. The cylinder 45 should preferably be constructed of magnetic material having low magnetic losses and high electrical resistance in order to reduce the eddy current losses to a minimum. Connection is made to the cylinder 45 by means of the lead 46 and the connections of the device when in circuit are similar to the devices of Figs. 12 and 14. The cylinder 45 instead of being closed may also have a longitudinal slit to prevent the circulation of short circuit currents induced in it by the coil 3.

Figure 16:
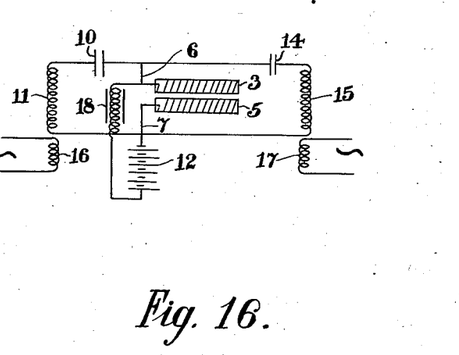
Fig. 16 shows a diagram of connections in which the whole of the frequency range converter device is common to primary and secondary circuits.

Devices according to Figs. 10, 12, 14 and 15 may be used with only two connections to the device, for instance in Fig. 10 connections 6 and 8, in Fig. 12 connections 6 and 41, in Fig. 14 connections 6 and 31, and in Fig. 15 connections 6 and 46, but in these cases a different type of circuit must be used, in which the inductance of the frequency range converting device is common to both primary and secondary circuits. One such arrangement is shown in Fig. 16, in which it will be seen that the coils 3 and 5 of the device of Fig. 10 are common to both the primary circuit and the secondary circuit, the source of potential 12 and a choke 18 being shunted across the coils 3 and 5. The device of Fig. 13 with only two conductors 38 and 39 may be used also in the arrangement of Fig. 16.

The primary circuit in the arrangement of Figs. 2, 3, 11 and 16 actuates the frequency range converter in half-cycles, that is to say the frequency range converter acts as a rectifier of the oscillations in the primary circuit, there being no discharge in the frequency range converter during the negative half cycles, consequently the primary current through the device is in the nature of isolated impulses, i. e. the positive half cycles, and in the arrangement of Figs. 3, 11 and 16 the inductance 18 tends to maintain a constant primary current flowing through the frequency range converter, which constant current is approximately at the mean level of the impulses. The second circuit also when oscillating produces a variation of the discharge in the frequency range converter, the amplitude of the oscillation being approximately equal to the amplitude of the steady primary current and again the inductance 18 tends to maintain a constant current through the device.

The more constant the primary current through the device, the better will be the oscillation produced in the secondary circuit, and for this reason two devices, or a double device may be used so as to obtain the full wave rectification of the primary oscillation, which will obviously result in a more constant oscillation in the secondary circuit. Further disadvantages of the arrangements shown in Figs. 2, 3, 11 and 16 are that primary frequencies may be induced in the secondary circuit by inductive, capacitative and conductive coupling, and for this reason it is generally preferable that the range of frequencies in the secondary circuit shall be completely outside the tuning range of the primary circuit and vice versa, in order that secondary frequencies induced in the primary circuit shall not set up new primary oscillations capable of actuating the frequency range converter. Otherwise one primary frequency will set up in the secondary circuit a different frequency which will appear, due to the coupling, in the primary circuit and will in turn produce another secondary frequency, and so on, until each primary frequency will have produced a very large number of secondary frequencies. These difficulties can also be obviated by the use of a double device, and a suitable type is shown in Fig. 17 which may be considered as a double device of a type similar to that shown in Fig. 15.

Figure 17:
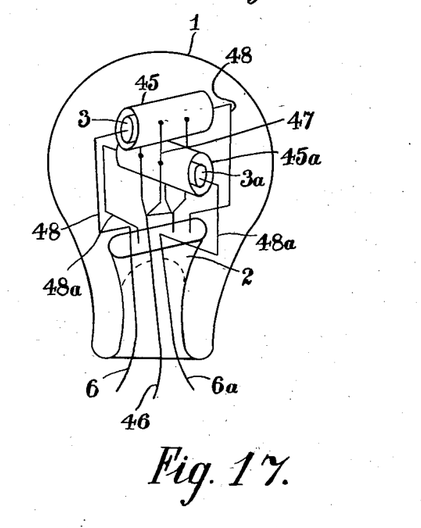
Fig. 17 shows a double form of frequency range converter of the Fig. 15 type.

In Fig. 17 there are mounted at right angles to one another two coils 3 and 3a supported by the supports 48 and 48a respectively, one end of each coil being connected to external circuits by means of the leads 6 and 6a respectively. Around each of these coils and concentric therewith is disposed an open-ended conducting cylinder, the cylinder 45 being arranged around coil 3 and the cylinder 45a around coil 3a. These two cylinders are connected together and supported by the supports 47 and both are connected to the external circuit by means of the lead 46. All the supports are mounted in the pinch 2 so that the various parts are held in a rigid relation to each other. The two coils are mounted at right angles in order that they shall not have appreciable mutual inductance. The use of the device is shown in Fig. 18.

Figure 18:
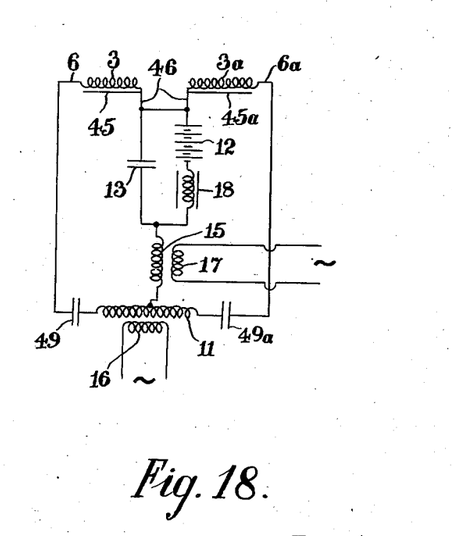
Fig. 18 shows a diagram of connections using the device of Fig. 17.

In Fig. 18 the double device represented by the coils 3 and 3a and the conductors 45 and 45a are connected as shown, one end of a coil 15 being connected to the middle point of a coil 11. Consequently the primary circuit, which consists of coil 11, condenser 49, coil 3, conductor 45, conductor 45a, coil 3a and condenser 49a, may be regarded as a double circuit, each half being equal, the first half being half of coil 11, condenser 49, coil 3, conductor 45, condenser 13 and inductance 15, and from the primary circuit point of view may be used in either way, that is the whole circuit or in half circuits. When used in half circuits, the frequency range converter will full wave rectify the primary oscillations. The secondary circuit consists of condenser 13, coil 15, and then branches into two parallel circuits, one consisting of half of coil 11, condenser 49a, coil 3 and conductor 45, and the other consisting of half of coil 11, condenser 49a, coil 3a and conductor 45a. Consequently the primary frequencies in coil 15 are rectified, and therefore cannot appear in coil 17, and the secondary frequencies in coil 11 travel in different directions in the two halves of the coil, therefore balance out in the primary circuit. From this it will be seen that primary and secondary frequencies are incapable of interfering with each other, as the circuit is a kind of bridge circuit.

In Figs. 3, 11, 16 and 18 the secondary oscillation will commence as soon as the primary actuating oscillation commences to be rectified in the primary range converter, but if that device has a lag, there will be a slight delayed action. Similarly when the primary oscillation ceases the secondary oscillation also ceases sometime later, depending on the lag. In order that the secondary oscillation may be constant, it is possible to apply reaction to the secondary circuit, for instance in Fig. 3 the anode coil of the triode 24 may be coupled to the inductance 15, but the amount of reaction must not be so great as to produce a constant oscillation, for should this be so the oscillation will persist after the primary actuating oscillation has ceased. By varying the amount of reaction it is also possible to produce the effect of lag in the frequency range converter.

In the devices of this invention it is preferable that the electric discharge between the electrodes shall be confined as much as possible, and for this purpose the coils used in the device may be wound in groups, the coils being so mounted that the formers touch or are very close together. In this way the discharge is confined to one group. Alternatively, separators may be placed between adjacent turns of the coils and between the coils for the same purpose.

Many other forms of device and circuit arrangements for frequency range conversion are possible within the scope of this invention, the essential feature of a frequency range converter being that each primary oscillation shall support a secondary oscillation of a different frequency, and that all the primary oscillations in a band shall simultaneously be able to produce corresponding secondary oscillations.

I claim:

1. Apparatus for converting electrical oscillations of a primary range of frequencies into electrical oscillations of a secondary range of frequencies different from said primary range, said apparatus comprising two resonant circuits capable of resonating over different frequency ranges, means for impressing electrical oscillations upon one of said circuits and means whereby the effective resonant frequency of the other of said circuits is determined by the frequency of the oscillations in said first circuit.

2. Apparatus for converting electrical oscillations of a primary range of frequencies into electrical oscillations of a secondary range of frequencies different from said primary range, said apparatus comprising two resonant circuits capable of resonating over different frequency ranges, means for impressing electrical oscillations upon one of said circuits and means whereby the effective resonant frequency of the other of said circuits is changed in steps as the frequency of the oscillations applied to said first circuit is changed.

3. Apparatus for converging electrical oscillations of a primary range of frequencies into electrical oscillations of a secondary range of frequencies, said apparatus comprising a glow discharge device, two impedance elements located within said device and constituting electrodes thereof, a first resonant circuit including one of said impedance elements, a second resonant circuit including the other of said impedance elements, means for applying oscillations of said primary range to said first circuit to produce a glow discharge in said device and means for deriving oscillations of said secondary range from said second circuit.

4. Apparatus for converting electrical oscillations of a primary range of frequencies into electrical oscillations of a secondary range of frequencies, said apparatus comprising a glow discharge device, two impedance elements located within said device to constitute electrodes thereof and having an elongated discharge space of substantially uniform width between them, a first resonant circuit including one of said impedance elements, a second resonant circuit including the other of said impedance elements, means for applying oscillations of said primary range to said first circuit to produce a glow discharge in said device and means for deriving oscillations of said secondary range from said second circuit.

5. Apparatus for converting electrical oscillations of a primary range of frequencies into electrical oscillations of a secondary range of frequencies, said apparatus comprising a glow discharge device, two impedance elements located within said device to constitute electrodes thereof and having an elongated discharge space of substantially uniform width between them, a first resonant circuit including one of said impedance elements, a second resonant circuit including the other of said impedance elements, means whereby a glow discharge in said discharge space serves to tune one of said circuits to one frequency and the other of said circuits to a different frequency, means for applying oscillations of said primary range to said first circuit to produce a glow discharge in said device and means for deriving oscillations of said secondary range from said second circuit.

6. Apparatus for converting electrical oscillations of a primary range of frequencies into electrical oscillations of a secondary range of frequencies, said apparatus comprising a glow discharge device, an impedance element located within said device and constituting an electrode thereof, two additional electrodes within said device, two resonant circuits each including the said impedance element, means for applying oscillations of said primary range to one of said circuits to produce a glow discharge in said device and means for deriving oscillations of said secondary range from said second circuit.

7. Apparatus for converting electrical oscillations of a primary range of frequencies into electrical oscillations of a secondary range of frequencies, said apparatus comprising a glow discharge device, an impedance element located within said device and constituting an electrode thereof, two additional electrodes within said device, two resonant circuits each including the said impedance element, means whereby a glow discharge in said device serves to tune one of said circuits to one frequency and the other of said circuits to a different frequency, means for applying oscillations of said primary range to one of said circuits to produce a glow discharge in said device and means for deriving oscillations of said secondary range from said second circuit.

8. Apparatus for converting electrical oscillations of a primary range of frequencies into electrical oscillations of a secondary range of frequencies, said apparatus comprising a glow discharge device, an impedance element located within said device and constituting an electrode thereof, two additional electrodes within said device having between them and said impedance element an elongated discharge space of substantially uniform width, two resonant circuits each including the said impedance element, means for applying oscillations of said primary range to one of said circuits to produce a glow discharge in said discharge space and means for deriving oscillations of said secondary range from said second circuit.

GEORGE WILLIAM WALTON.